I. N. KENDALL & R. HALL.
Metallic-Liners and Slab-Guards for Saws.
No. 217,114. Patented July 1, 1879.
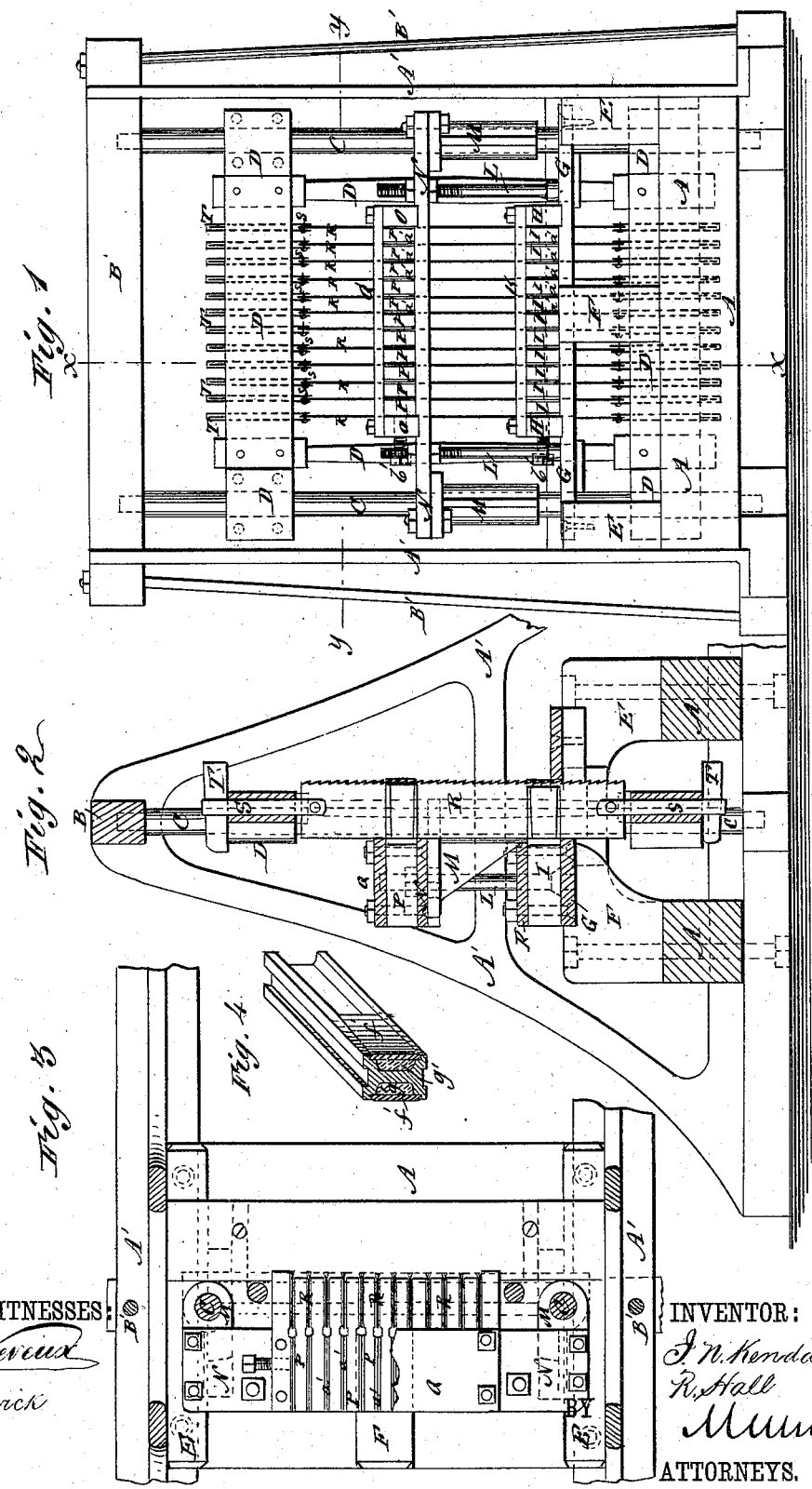

UNITED STATES PATENT OFFICE.

ISAAC N. KENDALL, OF BUCKINGHAM, AND RICHARD HALL, OF GATINEAU MILLS, QUEBEC, CANADA.

IMPROVEMENT IN METALLIC LINERS AND SLAB-GUARDS FOR SAWS.

Specification forming part of Letters Patent No. 217,114, dated July 1, 1879; application filed March 29, 1879.

*To all whom it may concern:*

Be it known that we, ISAAC NEWTON KENDALL, of Buckingham, in the county of Ottawa, Province of Quebec, and Dominion of Canada, and RICHARD HALL, of Gatineau Mills, in the county of Ottawa, Province of Quebec, and Dominion of Canada, have invented a new and useful Improvement in Metallic Liners and Slab-Guards for Saws, of which the following is a specification.

Figure 1 is an elevation showing the device applied to a gang of saws. Fig. 2 is a sectional elevation on line $x\,x$, Fig. 1. Fig. 3 is a transverse section on line $y\,y$, Fig. 1. Fig. 4 is an enlarged view, in perspective, of a liner and slab-guard.

Similar letters of reference indicate corresponding parts.

The object of this invention is to provide a device for preventing a saw or saws when they are in motion from deviating from their proper course, and thereby producing boards of irregular thickness.

In the drawings is shown an arrangement of a gang of saws, in which A A are the fender-sills, on which the brackets E E are securely bolted. B is the fender-beam, to which the upper ends of the race-rods C C are securely fixed, and which is supported by the frame A' and held down by the rods B' B'. C C are the race-rods, on which the saw-gate travels, and on which the sockets of the upper frame move up and down. D is the saw-gate in which the saws are hung. E E are the brackets through which the lower ends of the race-rods pass, and to which G (the transverse piece of the lower liners and slab-guards) is firmly bolted, for the purpose of keeping them always in proper position relative to the race-rods. F is a support securely fastened to the plate G in order to stiffen it, so that it may withstand any blow it may receive from a slab, &c. H H are the fence-bars checked into the transverse plate G, between which are placed the lower liners and slab-guards, I I. The distance between these guards is only enough to allow a very little sidewise play to the saw, and this distance is adjusted and maintained by the packing-slips, $a'\,a'$, set between them. In all cases the distance between the guards should be less than the kerf or width of the points of the teeth.

To place these guards in position a packing-slip is placed against one of the fence-bars, so as to give the saw proper play. Then one of the guards is set against the packing so that it will be parallel to the fence-bar, then another packing-slip, and so on until the desired number are in place. Then the tightening-screw $b'$ is turned to hold them firmly in their places. The cover-plate K is then put on, and secured by bolts and nuts to hold the guards to the transverse plate.

L L are the raising or lowering screws, to raise or lower the upper liners and slab-guards to suit the different sizes of the timbers or logs to be cut.

M are the sockets which move up and down on the race-rods, and to which is bolted the upper transverse piece N, upon which the upper fence-bars O O and the upper liners and slab-guards, P P, are secured, as are the lower ones. Q is the upper cover-plate, holding the upper bars and guards upon the transverse piece N.

R R are the saws that are hung in the gate, and which have stirrups S S on each end of them, through which pass the keys T T, that hold the saws in position.

The liner and slab-guards are made of an I section, as shown in Fig. 4, for the sake of economizing material and machine-work upon them. They are made preferably of wrought-iron.

At one end, in each dovetailed groove, are inserted slips $f'\,f'$, that are prevented from springing in the span by backings $g'\,g'$, of wood, paper-board, or other suitable material. These slips are made of cast-steel, smoothed and polished, or of glass or other material of sufficient hardness and durability.

When the material to be cut is brought into position, the upper liner and slab-guards are elevated or lowered to suit the dimensions of the stick to be cut. The stick is then fed forward, the lower liners and slab-guards being close to the under surface of the stick or log, and the upper ones close to the upper surface. The gate is then put in motion, and the saws commence to cut. As each saw cuts a wider track for itself than it has between the guards, the blade-surface cannot touch the wood that is being cut. Should the saw, however, be inclined to deviate from its proper course, it would bear lightly against the guard and be restored to position.

It is obvious that when these guards are used the lumber cannot be cut otherwise than of the right or even thickness both on top and bottom and throughout its length, and that they will prevent much of the trouble that is constantly arising in running slabbing-gangs and stock-gangs from the slabs, splinters, and burls that accidentally get fixed between the saw-blades and wedge them apart.

When using these guards we can run thinner saws than are at present used, thereby effecting a considerable saving in lumber, because we in effect reduce the length of the saw while retaining its length of stroke by presenting to the blade of the saw a hard smooth surface, which keeps it in position close to where it is doing its work. It is evident that the shorter the saw the more difficult it is to cause it to deviate from its proper course. In the ordinary gangs the saws soon become twisted and bent at their ends, and are seldom properly straightened. With this device the ends of the saws need not be straightened, as the guards keep the saws in position whether their ends be straight or not.

The advantages of metallic guards over those of wood are, that they are stronger; the friction between them and the saw is less; they present a hard and not easily worn surface to the saw, so that the saw shall not gain too much play; they can be worked or set closer to the saw, because they will not swell nor shrink when wet or dry.

These guards can be used on all saws for sawing any kind of lumber or wood. They can be applied effectively to stock-gangs, to slabbers, to band-saws, and to circular saws. When applied to slabbers the necessary saws are removed from the center of the gang and the central portion of the cover-plate K, and its corresponding guards taken away to allow the track to pass over the lower transverse plate, to which it would be bolted; then the inner ends of the cover-plate would be bolted, as are the outer ones.

The application of this device not only prevents slabs, knots, &c., from becoming fixed between the saws, but also prevents them from falling down to the lower floor in steam-mills and getting into the sawdust-carriers, and very often damaging them; also, in water-mills, from falling into the water and causing the formation of shoals and rafts in the rivers.

Having thus described our invention, we claim as new and desire to secure by Letters Patent—

1. A metallic liner or slab-guard made I-shaped in cross-section, and provided at one end, on opposite sides, with the glass or metal slips $f'\ f'$, and the backings $g'\ g'$, inserted in the longitudinal cavities of its sides, substantially as shown and described, and for the purpose set forth.

2. In combination with the metallic liners and slab-guards I and P, I-shaped in cross-section, the metallic or glass slips $f'\ f'$, secured in the longitudinal cavities of their sides, substantially as and for the purpose described.

ISAAC NEWTON KENDALL.
RICHARD HALL.

Witnesses:
J. A. CHAMPAGNE,
BERNARD SIMOON.